May 19, 1953  G. E. ROWE  2,638,718
NECK PIN LUBRICATING MECHANISM
Filed Sept. 19, 1950
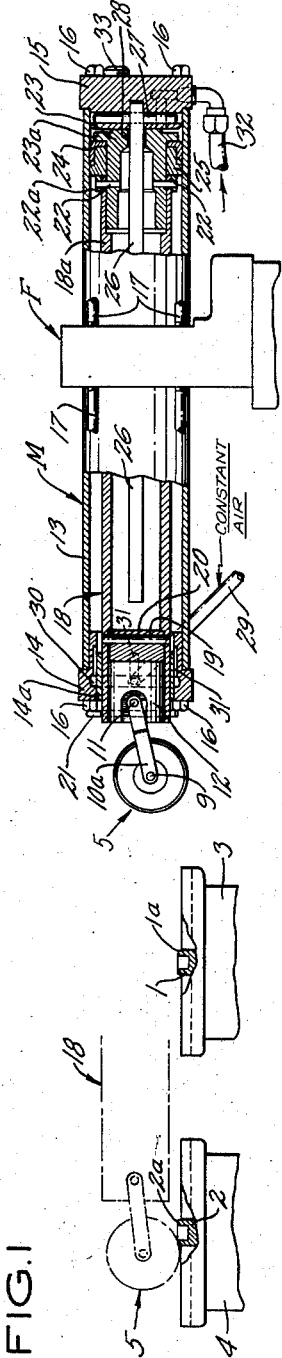
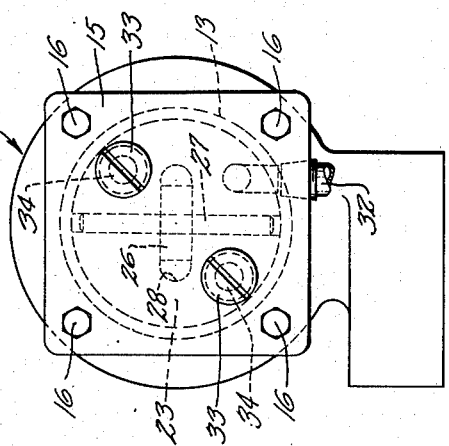
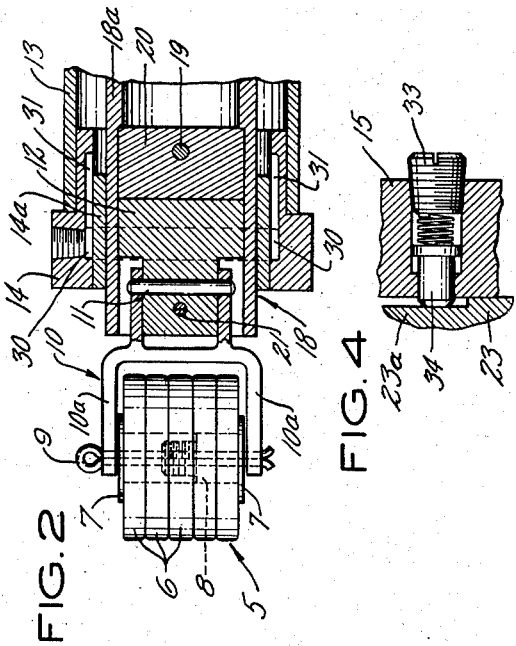
INVENTOR
GEORGE E. ROWE
BY Parham & Bates
ATTORNEYS

UNITED STATES PATENT OFFICE 2,638,718

NECK PIN LUBRICATING MECHANISM

George E. Rowe, Wethersfield, Conn., assignor to Emhart Manufacturing Company, a corporation of Delaware Application September 19, 1950, Serial No. 185,661

3 Claims. (Cl. 49—14)

The present invention relates generally to the manufacture of glassware and more particularly to the automatic lubrication or coating of the tips of neck pins, such as are employed, for example, in automatic glassware forming machinery of the so-called blow-and-blow type in which a neck pin molds the corkage recess of the ware prior to blow-molding a parison which thereafter may be transferred into a finishing mold for blowing into a bottle or other type of blown ware.

While the invention may be employed to coat with graphite or other suitable lubricant, conventional solid neck pins which are withdrawn prior to blow-molding a parison, a principal object is to lubricate and insulate the rims of hollow-ended plungers such as are disclosed in U. S. Patents 2,142,954 and 2,142,955 with which parison molding is effected while the neck-pin remains in its corkage molding position and without retracting the pin from the molding position to effect corkage reheat.

Hollow-ended neck pins lubricated in accordance with the invention aid in the production of corkages free from inside ledges and depressions such as may be produced by neck pins not so treated.

Apparatus embodying the invention may comprise a roller made of felt or other suitable material which is impregnated with graphite or similar material and which is pivotally mounted on the end of a reciprocating rod so that it may be rolled over the top rim surfaces of the hollow ended neck pins during each bottle making cycle.

For a more complete description of a preferred embodiment of the invention, reference is made to the accompanying drawing wherein:

Figure 1 is a side elevational view partly in cross-section of a roller-doper for coating the tips of hollow ended neck pins;

Fig. 2 is an enlarged plan view of the front or roller end of the roller-doper shown in Fig. 1, certain parts being in section to reveal its construction;

Fig. 3 is an enlarged end view of the rear of the doper; and

Fig. 4 is an enlarged cross-sectional view of means incorporated in the doper for cushioning in its back stroke.

Referring more particularly to Fig. 1, there is shown a pair of vertically reciprocal hollow neck pins 1 and 2, such as are employed in hollow plunger operation of the well known Hartford I. S. Machine. The upper portion of receivers 3 and 4 which serve to reciprocate the neck pins 1 and 2, respectively, also are shown. The neck ring parison molds and other components which comprise the I. S. Machine are not shown as they are well known and not necessary to understanding of the present invention.

As shown in Fig. 1, the neck pins 1 and 2 are disposed so that their tips 1a and 2a, respectively, project slightly above the top surface of the receivers 3 and 4. This position is one at which they normally dwell for a period of time preliminary to their upward travel to their corkage molding and parison blowing positions.

In accordance with the present invention, a graphite impregnated roller, generally designated 5, is caused to move in a generally horizontal line to the position shown in phantom and back to the position and shown in solid lines and in so doing to ride or roll up and over the top rim surfaces 1a and 2a from its normal position below the tips of the retracted pins and deposite a coating of graphite thereon preliminary in the corkage-forming and parison blowing operations.

More particularly, the roller 5 consists of a series of circular felt pads 6 which are secured between flanges 7 of a hollow shaft 8 that is rotatably mounted on a cotter pin 9 within arms 10a of a yoke 10.

As shown in Figs. 1 and 2, the yoke 10 is supported for limited pivotal movement by means of a pin 11 relative to a horizontal reciprocable head 12 so that the roller 5 is permitted sufficient vertical movement to ride up on the tips 1a and 2a of the neck pins, and to compensate for variations in the elevations of the neck pins relative to the horizontal line of travel of head 12.

In the illustrated embodiment of the invention, an air motor, generally designated M, moves the head 12 and roller 5 between the solid and phantom line positions shown in Fig. 1. The motor M includes an air cylinder 13 supported in a frame member F and having cylinder heads 14 and 15 secured to its end, as by means of nuts 16 and tie rods 17 which are fastened to the frame F. A piston 18 which is formed in part by a cylindrical sleeve 18a is slidably journaled in a bushing 14a within the cylinder head 14 and extends into the cylinder 13. A pin 19 permanently secures a plug 20 within the front end of the piston sleeve 18a and the yoke supporting block 12 is detachably secured in front of the plug and within the sleeve as by means of cotter pin 21.

Secured in the rear end of the sleeve 18a, as by means of pins 22, is a cored piston plug 23 having a flanged rear end 23a against which a piston ring 24 is secured by a collar 25 that is fastened on the sleeve 18a by the pins 22 and a ring 22a.

In order to prevent rotation of the sleeve 18a within the cylinder 13, a rod 26 of rectangular or other non-circular cross-section is secured by pin 27 to the cylinder head 15 and extends forwardly so as to cooperate with a slotted opening 28 in the plug 23 and prevent relative rotary motion therebetween throughout the stroke of the piston 18 and the roller 5 which it operably carries.

The piston 18 is constantly urged to its rearmost position by air pressure which is supplied constantly through a line 29 to an annular chamber 30 in the forward cylinder head 14 and through passageways 31 to urge the piston collar 25 and piston 18 to its retracted or rear position shown by solid lines in Fig. 1.

In accordance with the present invention, the roller 5 rolls or rides over the neck pins 1 and 2 to the position shown in phantom in Fig. 1 and deposits a coating of graphite on the plunger tip surfaces 1a and 2a preparatory to each parison molding operation. More particularly, while the neck pins are in the positions illustrated in Fig. 1 and preparatory to each molding operation, air is supplied, as by a timer (not shown), through a line 32 to the interior of the cylinder 13 at a point rearward of the piston ring 24. The air supplied through the line 32 may be maintained at a higher pressure than that supplied through the line 29 or, inasmuch as the effective piston area presented by the rear end of the piston plug 23 is greater than the effective piston area presented to the air from line 29 by the collar 25, the air pressure may be the same or even less. In any case, the force exerted on the piston by the air pressure from line 32 must be sufficient to overcome the constant retracting force exerted through line 29 and force the piston to its forward position, whereupon air pressure in line 32 is discontinued and the constant pressure in line 29 returns the piston to its retracted position.

In order to cushion the return stroke of the piston, the cylinder head 15 may be provided, as shown in Figs. 3 and 4, with a pair of diametrically spaced threaded pipe plugs 33 which retain a spring pressed pin 34 in position to engage and resiliently snub or cushion the piston 18 at the end of its retracting or return stroke.

The present invention provides automatic means for daubing the neck pins in situ and applying a uniform coating such as graphite to the tips preparatory to each successive corkage forming and parison blowing operation and without interrupting the rest of the forming machine operational cycle in which it is integrated.

Having thus described a preferred embodiment of the invention, I claim:

1. In combination with a glassware forming machine for manufacturing bottles which includes a vertically reciprocable neck pin movable between a corkage molding upper position and a retracted lower position, a graphite impregnated applicator mounted for limited movement on a head member, motor means for reciprocating said head member and roller-applicator between a forward position and a retracted position in a path such that the roller-applicator rides over the tip of the neck pin, said motor means including means for constantly urging said roller-applicator to one of said roller-applicator positions, and means for forcing said roller-applicator to the other of its two positions.

2. In combination with a glassware forming machine for manufacturing bottles which includes a vertically reciprocable neck pin movable between a corkage molding upper position and a retracted lower position, a graphite impregnated felt roller-applicator mounted for limited pivotal movement on a head member, motor means for reciprocating said head member and roller applicator between a forward position and a retracted position in a path such that the roller-applicator rides over the tip of the retracted neck pin in moving to its forward position and in returning to its retracted position, said motor means including means constantly urging said roller-applicator to one of said roller-applicator positions, and means for forcing said roller-applicator to the other of its two positions when said neck pin is in its retracted position.

3. In combination with a glassware forming machine for manufacturing bottles which includes a vertically reciprocable hollow tip neck pin movable between a corkage molding upper position and a retracted lower position, a graphite impregnated felt roller-applicator detachably mounted for limited pivotal movement on a head member, motor means for reciprocating said head member and roller-applicator between a forward position and a retracted position in a path such that the roller-applicator rides over the tip of the retracted hollow neck pin, said motor means including means for constantly urging said roller-applicator to the retracted position, and actuating means for forcing said roller-applicator to the forward position.

GEORGE E. ROWE.

References Cited in the file of this patent

UNITED STATES PATENTS

| Number | Name | Date |
|---|---|---|
| 286,892 | Andrus | Oct. 16, 1883 |
| 805,299 | Kastenhuber | Nov. 21, 1905 |
| 988,636 | Fogle | Apr. 4, 1911 |
| 1,439,372 | Lott | Dec. 19, 1922 |
| 2,142,954 | Rowe | Jan. 3, 1939 |
| 2,142,955 | Rowe | Jan. 3, 1939 |
| 2,246,463 | Garratt | June 17, 1941 |
| 2,564,308 | Nagel | Aug. 14, 1951 |

OTHER REFERENCES

Glass Industry, vol. 26, No. 3, March 1945, pages 125 to 127 and 151, "Colloidal Graphite and Its Use in the Glass Industry."